(12) United States Patent
Oyamada et al.

(10) Patent No.: US 11,504,818 B2
(45) Date of Patent: Nov. 22, 2022

(54) MACHINE TOOL, PROCESSING SYSTEM, AND FITTING DETERMINATION METHOD OF PULL STUD

(71) Applicant: FANUC CORPORATION, Yamanashi (JP)

(72) Inventors: Tomohiro Oyamada, Yamanashi (JP); Rikizou Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 459 days.

(21) Appl. No.: 16/743,196

(22) Filed: Jan. 15, 2020

(65) Prior Publication Data

US 2020/0269372 A1 Aug. 27, 2020

(30) Foreign Application Priority Data

Feb. 27, 2019 (JP) .............................. JP2019-033854

(51) Int. Cl.
*B23Q 3/157* (2006.01)
*B23Q 17/24* (2006.01)
(Continued)

(52) U.S. Cl.
CPC ...... *B23Q 3/15534* (2016.11); *B23Q 3/15573* (2013.01); *Y10T 483/136* (2015.01); *Y10T 483/14* (2015.01)

(58) Field of Classification Search
CPC .............. Y10T 483/136; Y10T 483/13; B23Q 3/155–3/15793; B23Q 17/24–17/2495
(Continued)

(56) References Cited

U.S. PATENT DOCUMENTS

| 4,773,800 A | 9/1988 | Furuhashi et al. |
| 5,662,567 A * | 9/1997 | Rutschle ................. B23B 31/00 483/10 |

(Continued)

FOREIGN PATENT DOCUMENTS

| DE | 19930272 A1 | 1/2001 |
| EP | 3 357 637 A1 | 8/2018 |

(Continued)

OTHER PUBLICATIONS

Machine Translation of JP 2006-305663-A, which JP '663 was published Nov. 2006.*

(Continued)

*Primary Examiner* — Erica E Cadugan
(74) *Attorney, Agent, or Firm* — Maier & Maier, PLLC

(57) ABSTRACT

A machine tool for machine processing workpieces by using a tool having a pull stud at a proximal end portion thereof. The machine tool includes a tool magazine having a number of tool holders each of which is capable of attaching and detaching the tool, a spindle which holds the tool at the time of machine processing the workpieces, and a controller which determines whether or not the pull stud is appropriate on the basis of detected data of a visual sensor which is provided inside or outside the machine tool, and which captures images of the pull stud of a tool holder of the tool, or detected data of a sensor which is provided inside the tool magazine, and which measures length, electric resistance, or electric capacity of the pull stud.

7 Claims, 14 Drawing Sheets

(51) Int. Cl.
*B23Q 17/00* (2006.01)
*B23Q 3/155* (2006.01)

(58) Field of Classification Search
USPC .................................... 483/10, 7; 700/179
See application file for complete search history.

(56) References Cited

U.S. PATENT DOCUMENTS

| | | | |
|---|---|---|---|
| 5,762,454 A * | 6/1998 | Yamada | B23Q 17/006 |
| | | | 483/10 |
| 2005/0014618 A1* | 1/2005 | Prust | B23Q 3/15553 |
| | | | 483/7 |
| 2016/0334777 A1 | 11/2016 | Sato | |
| 2018/0015585 A1* | 1/2018 | Kasahara | G01B 11/24 |
| 2018/0215001 A1* | 8/2018 | Kasahara | B23Q 11/0891 |
| 2018/0222002 A1* | 8/2018 | Kasahara | B23Q 17/2409 |
| 2018/0250784 A1 | 9/2018 | Kasahara | |
| 2018/0354085 A1* | 12/2018 | Li | B23Q 11/001 |
| 2019/0022812 A1 | 1/2019 | Ueno et al. | |
| 2019/0299352 A1 | 10/2019 | Michiwaki | |
| 2020/0230758 A1* | 7/2020 | Isobe | B23Q 17/2457 |

FOREIGN PATENT DOCUMENTS

| | | |
|---|---|---|
| EP | 3 406 398 A1 | 11/2018 |
| EP | 3 511 096 A1 | 7/2019 |
| JP | S52-040077 U | 3/1977 |
| JP | S54-109978 U | 8/1979 |
| JP | S56-007638 U | 1/1981 |
| JP | S60-009628 A | 1/1985 |
| JP | H02-097549 U | 8/1990 |
| JP | H07204978 A | 8/1995 |
| JP | 2006-125941 A | 5/2006 |
| JP | 2006-305663 A * | 11/2006 |
| JP | 2008-246586 A | 10/2008 |
| JP | 2016218550 A | 12/2016 |
| JP | 2018-043339 A | 3/2018 |
| JP | 2018-094697 A | 6/2018 |
| JP | 2018-144121 A | 9/2018 |
| WO | WO-2017/017824 A * | 2/2017 |
| WO | 2017056264 A1 | 4/2017 |
| WO | 2017126010 A1 | 8/2018 |

OTHER PUBLICATIONS

Japanese Office Action dated May 25, 2021, in connection with corresponding JP Application No. 2019-033854 (14 pp., including machine-generated English translation).

Japanese Search Report dated Apr. 22, 2021, in connection with corresponding JP Application No. 2019-033854 (17 pp., including machine-generated English translation).

* cited by examiner

MACHINE TOOL, PROCESSING SYSTEM, AND FITTING DETERMINATION METHOD OF PULL STUD

CROSS-REFERENCE TO RELATED APPLICATIONS

This application is based on and claims priority to Japanese Patent Application No. 2019-033854 filed on Feb. 27, 2019, the entire content of which is incorporated herein by reference.

FIELD

This invention relates to a machine tool, a processing system, and a fitting determination method of a pull stud.

BACKGROUND

Conventionally, there is a known machine tool which has a tool magazine capable of storing a plurality of tools, and which automatically changes the tool to be attached to a spindle (for example, see Japanese Unexamined Patent Application, Publication No. 2018-094697; Japanese Unexamined Patent Application, Publication No. 2008-246586; Japanese Unexamined Patent Application, Publication No. S60-009628; Japanese Unexamined Utility Model Application, Publication No. S54-109978; and Japanese Unexamined Utility Model Application, Publication No. S52-040077). The machine tool in Japanese Unexamined Patent Application, Publication No. 2018-094697; Japanese Unexamined Patent Application, Publication No. 2008-246586; Japanese Unexamined Patent Application, Publication No. S60-009628; Japanese Unexamined Utility Model Application, Publication No. S54-109978; and Japanese Unexamined Utility Model Application, Publication No. S52-040077 is provided with a function which identifies the tools. Also, a method for detecting that a tool is erroneously set to a tool holder by means of a jig is known (for example, see Japanese Unexamined Patent Application, Publication No. 2018-144121).

SUMMARY

A first aspect of the present invention is machine tool which processes workpieces by using a tool having a pull stud at a proximal end portion thereof, the machine tool comprising: a tool magazine having a plurality of tool holders each of which the tool is attached to and detached from; a spindle which holds the tool at the time of processing the workpieces; and, a controller which determines whether or not the pull stud fits based on detected data of a visual sensor which is provided inside or outside the machine tool and which captures images of the pull stud of the tool, or detected data of a sensor which is provided in the tool magazine and which measures length, electric resistance, or electric capacity of the pull stud.

A processing system of a second aspect of the present invention includes the above described machine tool, a robot, and a robot controller for controlling the robot, and the visual sensor is attached to the robot, and the robot controller moves the visual sensor to a position for capturing images of the pull stud on the basis of an imaging command from the controller of the machine tool.

A third aspect of the present invention is a fitting determination method of a pull stud for determining whether or not the pull stud of a tool to be attached to a tool magazine is appropriate, and the fitting determination method includes steps of attaching the tool to the tool magazine; obtaining, by the controller, detected data of a visual sensor, or detected data of a sensor which measures length, electric resistance, or capacitance of the pull stud, for the pull stud of the tool which is intended to be attached to the tool magazine, or the tool which is attached to the tool magazine; and, determining whether or not the pull stud is appropriate on the basis of the detected data.

DETAILED DESCRIPTION

Figure 1:
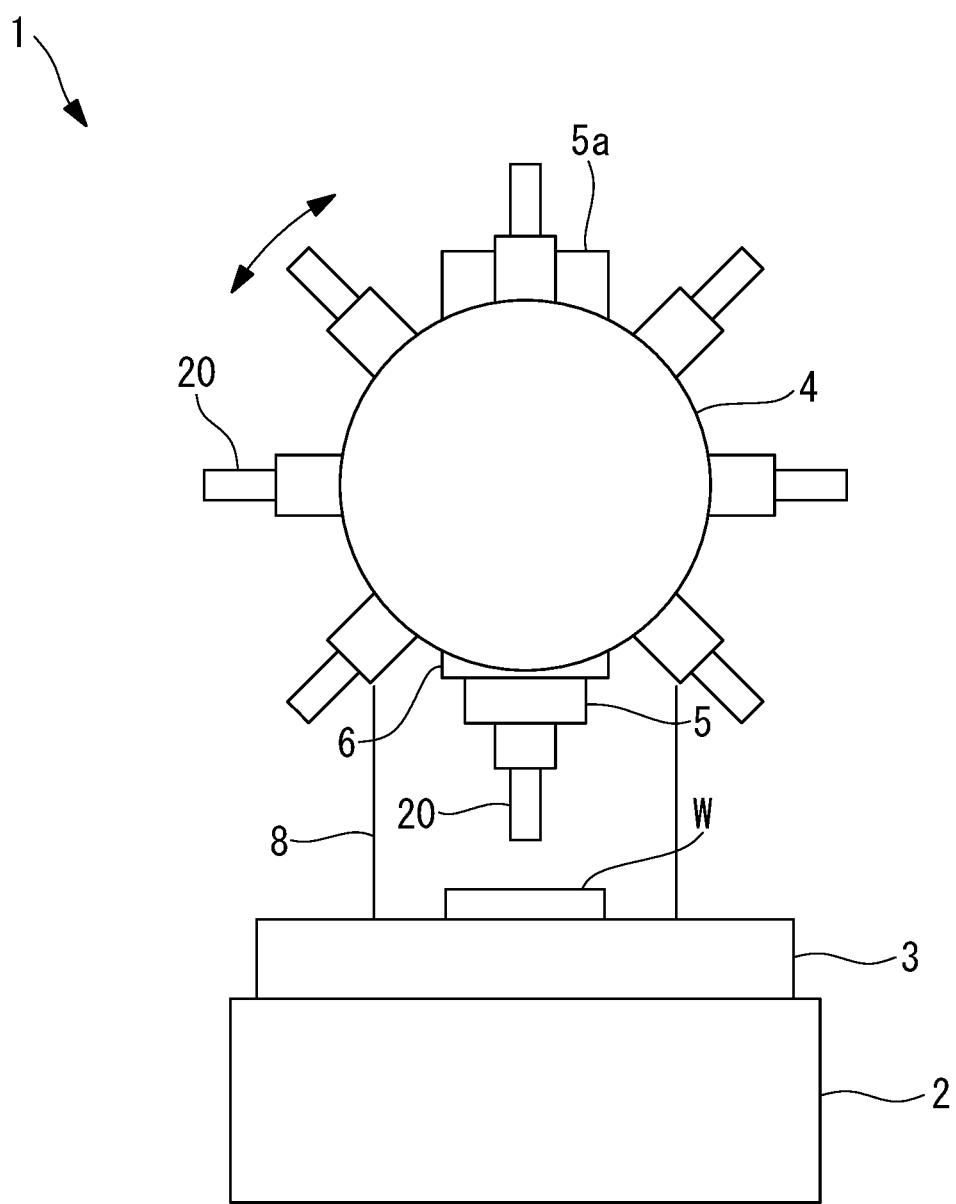
FIG. 1 is a schematic front view of a machine tool according to an embodiment of the present invention.
Figure 2:
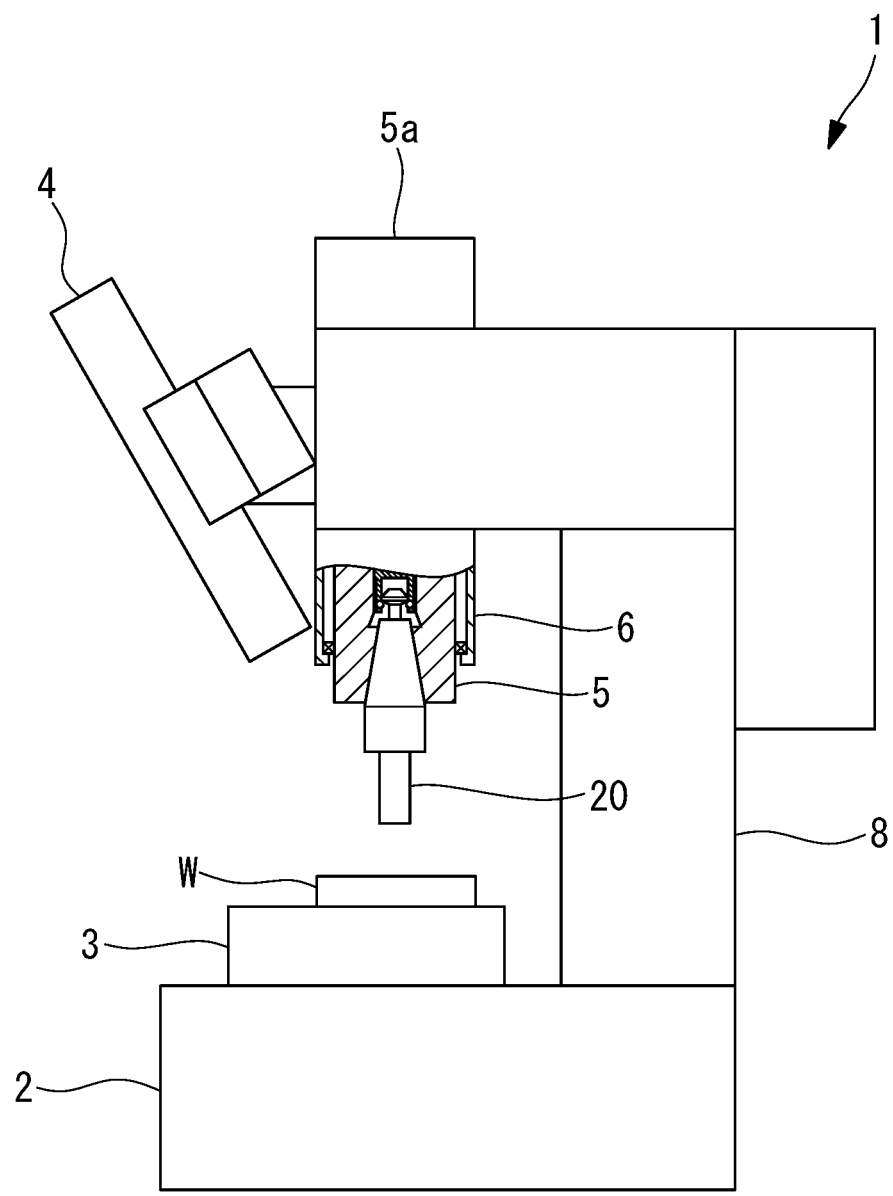
FIG. 2 is a schematic side view of the machine tool of FIG. 1.

A machine tool 1 according to an embodiment will be described below with reference to the drawings. As shown in FIGS. 1 and 2, the machine tool 1 of this embodiment includes a base 2, a table 3 to which a workpiece W is fixed, a tool magazine 4 which stores a plurality of tools 20, a spindle 5 which alternatively supports the plurality of tools 20 which are stored in the tool magazine 4, and a spindle head 6 which supports the spindle 5. The machine tool 1 has a function which automatically changes the tools 20 between the tool magazine 4 and the spindle 5.

The base 2 is disposed at a place where the machine tool 1 is used by using a leveling bolt, an anchor bolt, and the like, for example. The table 3 is placed on the base 2, and the workpiece W is fixed on an upper surface of the table 3 by an arbitrary fixing method. The table 3 and the workpiece W are moved in a horizontal direction with respect to the spindle 5 by a feed motor (not shown) which is provided at the base 2. A column 8 which is fixed to the base 2, and which extends in a vertical upward direction from the base 2 is provided at a back side of the table 3. The tool magazine 4 and the spindle 5 are supported by an upper end portion of the column 8, and the tool magazine 4, the spindle 5, and the spindle head 6 are arranged above the table 3.

Figure 3:
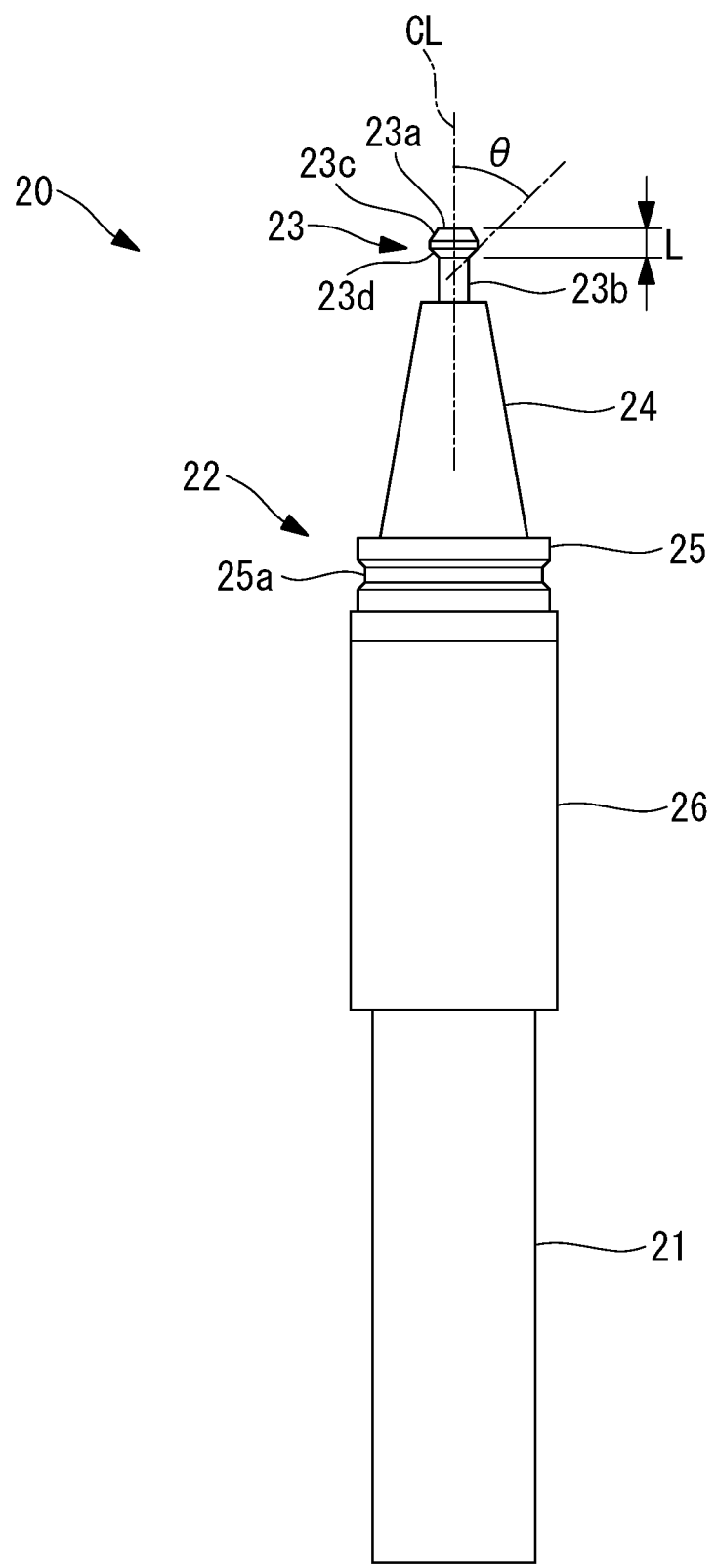
FIG. 3 is a schematic side view of a tool which is used for the machine tool of FIG. 1.

FIG. 3 shows a side view of the tool 20. As shown in FIG. 3, the tool 20 has a tool body 21, and a tool holder 22 which holds the tool body 21. The tool body 21 is a part which comes into contact with the workpiece W so as to machine process the workpiece W, and the tool body 21 can be any kind of tool, such as a drill, a tap, or a milling cutter, and the like, for example. In an order from a proximal end side to a distal end side, the tool holding portion 22 includes a pull stud 23 which is held by the spindle 5, a tapered portion 24, a flange portion 25 which is held by a tool holder 9 (described hereinafter) of the tool magazine 4, and a collet portion 26 which holds the tool body 21. A collet for holding the tool body 21 is provided in the collet portion 26, and the tool body 21 is held by the collet portion 26 by making a diameter of the collet smaller.

The pull stud 23 includes a head portion 23a, and a shaft portion 23b which extends in a longitudinal axis of the tool 20, and which connects the head portion 23a and the tapered portion 24. A distal end of the pull stud 23 is screwed into a screw hole which is provided in the tapered portion 24, and the head portion 23a is provided at a proximal end of the pull stud 23. An outer diameter of the head portion 23a is larger than that of the shaft portion 23b, and tapered surfaces 23c, 23d are respectively provided at the proximal end side and the distal end side of the head portion 23a. The tapered surface 23c at the proximal end side of the pull stud 23 is a cylindrical surface whose diameter is gradually increased from the proximal end side of the pull stud 23 toward the distal end side thereof. The tapered surface 23d at the distal end side of the pull stud 23 is a cylindrical surface whose diameter is gradually increased from the distal end side of the pull stud 23 toward the proximal end side thereof.

The tapered portion 24 extends along the longitudinal axis of the tool 20, and connects the pull stud 23 and the flange portion 25. The tapered portion 24 is formed so that the diameter thereof is gradually increased from the proximal end side toward the distal end side. The flange portion 25 is in a substantially column shape having an outer diameter which is larger than that of an outer diameter of the distal end of the tapered portion 24. A groove 25a for holding the tool 20 by means of the tool holder 9, which will be described hereinafter, is formed at an outer circumferential surface of the flange portion 25. The groove 25a extends continuously around an entire circumferential surface of the tool holder 9.

Figure 4:
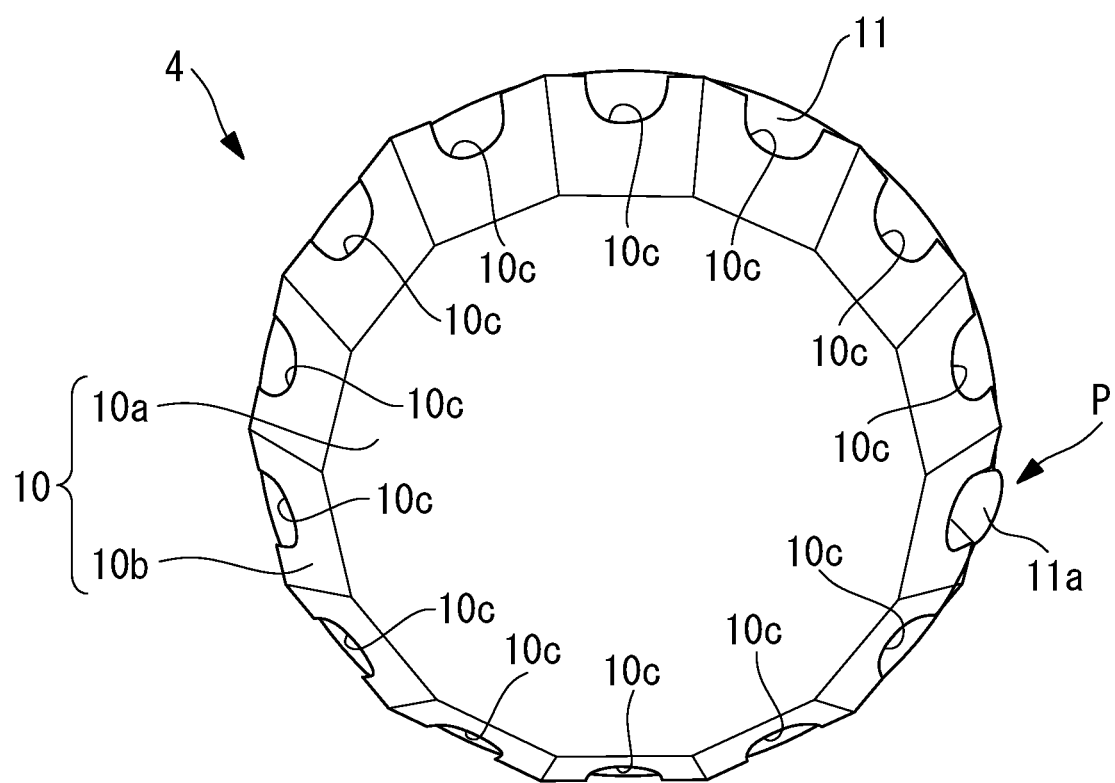
FIG. 4 is a front view of a tool magazine of the machine tool of FIG. 1.
Figure 5:
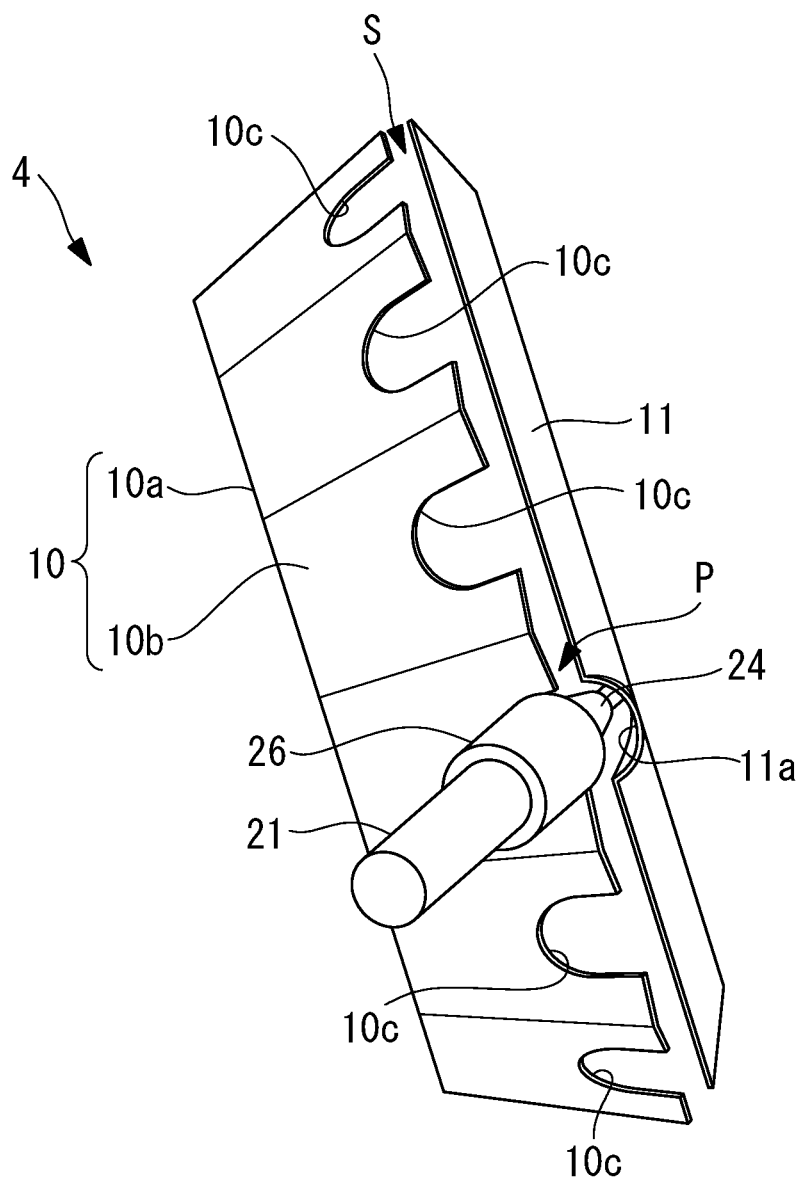
FIG. 5 is a side view of the tool magazine of FIG. 4.
Figure 6:
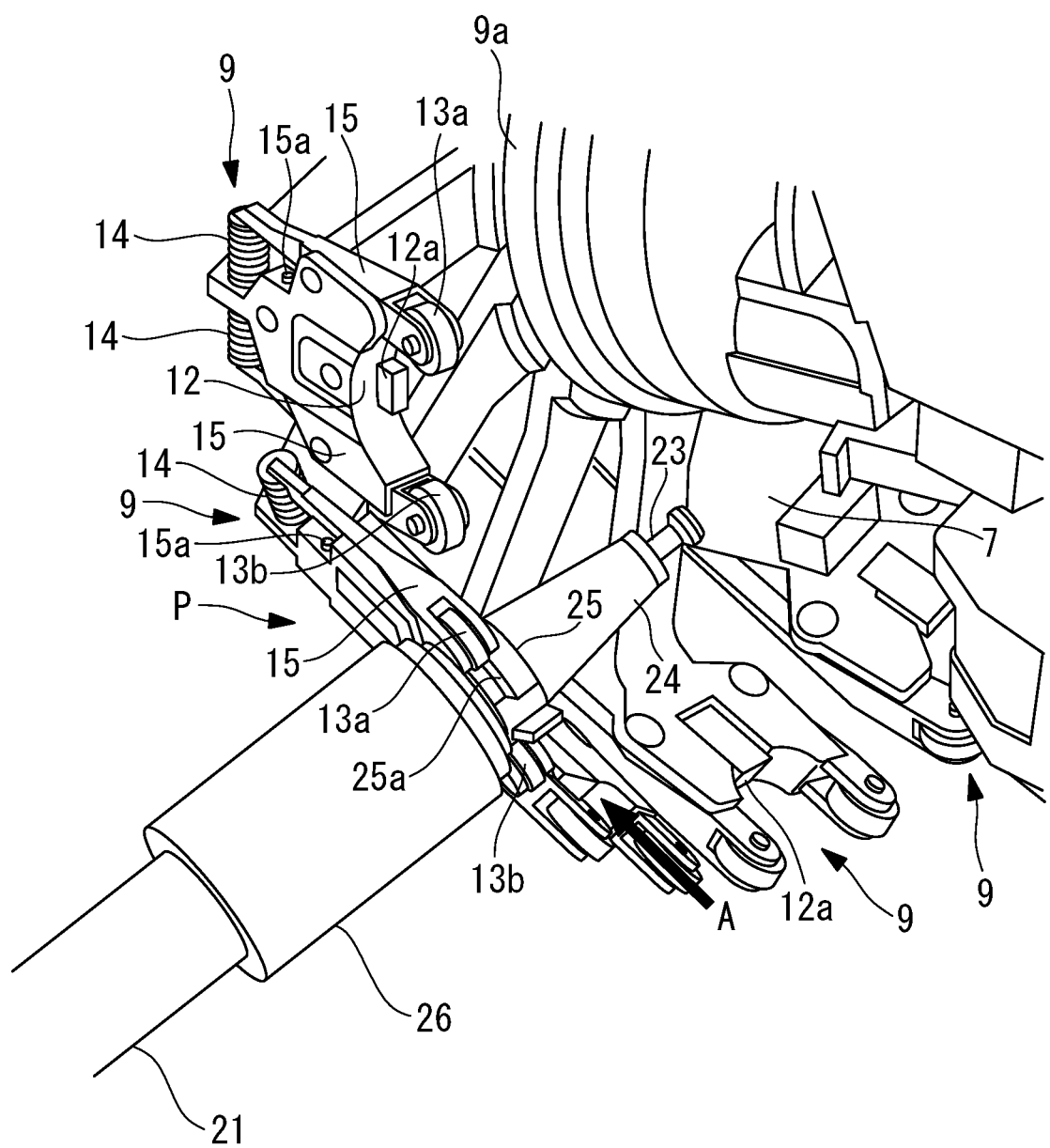
FIG. 6 is a perspective view which shows internal structure of the tool magazine of FIG. 4, and which is also a diagram explaining a method for attaching the tool to a tool holder.

FIGS. 4 and 5 show an external view of the tool magazine 4, and FIG. 6 shows internal structure of the tool magazine 4. The tool magazine 4 is in a substantially circular box shape. The tool magazine 4 includes a plurality of tool holders 9 (FIG. 6) which are arranged at an interval in a circumferential direction, and a front cover 10 and a back cover 11 (FIGS. 4 and 5) for covering the plurality of tool holders 9.

As shown in FIGS. 4 and 5, the front cover 10 includes a front panel 10a having a substantially circular-plate shape, which is arranged at a front side of the tool magazine 4, and a side panel 10b having a substantially annular shape, which is arranged at a side of the tool magazine 4. The back cover 11 is a back panel having a substantially circular-plate shape, which is arranged at the back side of the tool magazine 4. Opening portions 10c are provided at positions corresponding to each of the tool holders 9 of the side panel 10b. A space S which is formed by the covers 10, 11, is made communicate with an outside of the covers 10, 11 in a radial direction by the openings 10c, and the tools 20 which are held by each of the tool holders 9 respectively pass through the opening portions 10.

The plurality of the tool holders 9 are supported by a holding base 9a, and the holding base 9a is supported by an upper end portion of the column 8 so as to be rotatable around a center axis line of the front cover 10. The front cover 10 and the holding base 9a are integrally rotated around the center axis line of the front cover 10 by means of a rotatory motor (not shown). By this, the plurality of tool holders 9 rotate around the above described center axis line, and by the rotation of the tool holders 9, the tool holders 9 are alternatively arranged at a predetermined tool attaching and detaching position P. As shown in FIGS. 4 and 5, a concave portion 11a which is recessed in a direction away from the front panel 10a is formed at a position corresponding to the tool attaching and detaching position P in the back cover 11. The tools 20 are attached to and detached from the tool holders 9 by an operator via a working space which is formed by the opening portions 10c and the concave portion 11a which are arranged at the tool attaching and detaching position P.

Also, a notch, which is not shown, for attaching the tool 20 at the distal end of the spindle 5 is provided at the lower end portion of the back cover 11. Moreover, by the rotation of the plurality of tool holders 9, the plurality of tool holders 9 are alternatively positioned at a tool changing position which is in the vicinity of the spindle 5. The tool changing position and a position of the notch correspond with each other. The machine tool 1 switches the tool 20 which is held by the spindle 5 by exchanging the tool 20 between the tool holder 9 at the tool changing position and the spindle 5. At the time of this exchange, the lower end portion of the tool magazine 4 may come close to the spindle 5 side.

Figure 7:
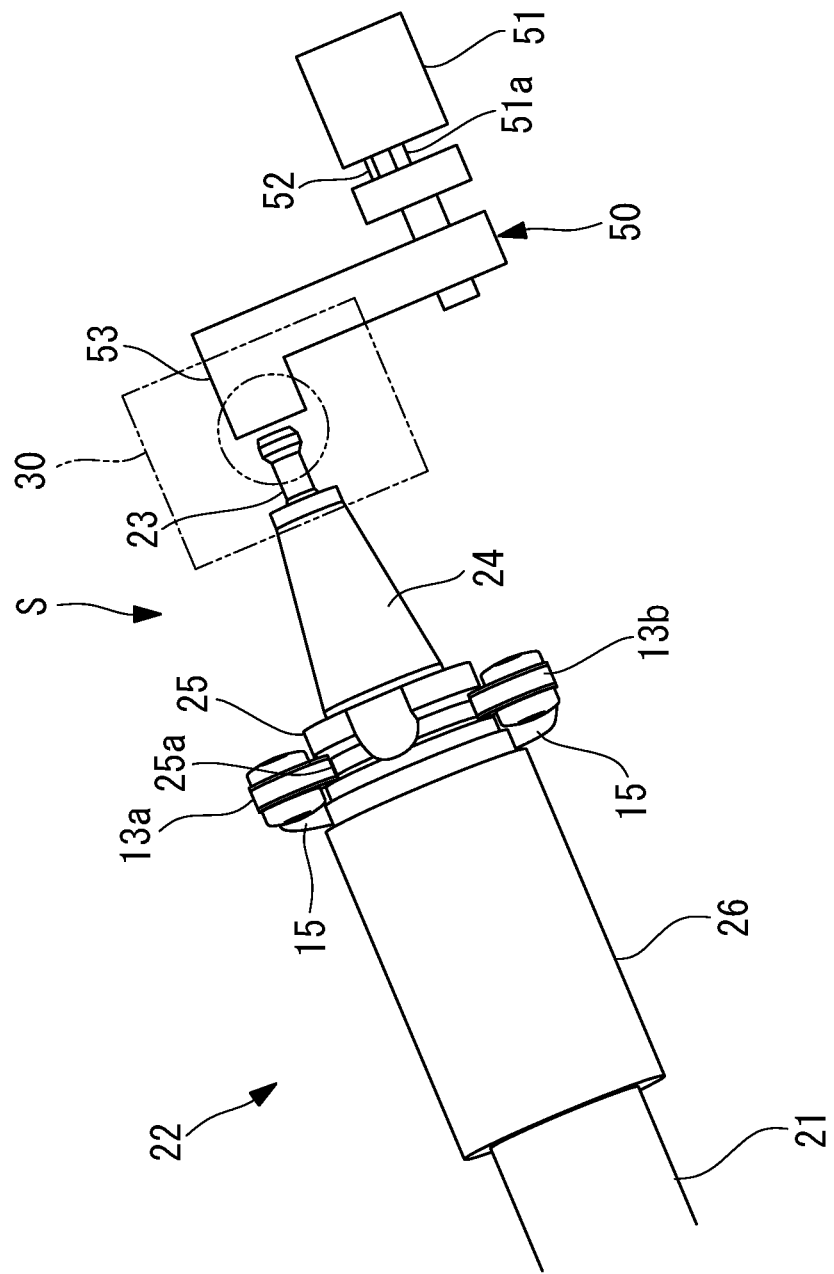
FIG. 7 is a view of the tool holder and the tool of FIG. 6, which is seen from a back side.

FIGS. 6 and 7 show a configuration example of the tool holders 9. The tool holder 9 holds the flange portion 25 of the tool 20 in such a state where the distal end of the tool body 21 is facing radially outward of the tool magazine 4. The tool 20 is attached to the tool holder 9 in a predetermined attaching direction A from the back side of the tool magazine 4 toward the front side thereof (FIG. 6). In FIG. 7, the attaching direction A is a direction which is directing from the front side to the back side of FIG. 7. More specifically, as shown in FIGS. 6 and 7, each of the tool holders 9 includes a concave portion 12 having a substantially semicircle shape, which accepts the flange portion 25 in the attaching direction A, and which supports the front side of the tool magazine 4 in the flange portion 25, a pair of rollers 13a, 13b which supports the back side of the tool magazine 4 in the flange 25 which is supported by the concave portion 12, a pair of swingable arms 15 each of which supports the pair of rollers 13a, 13b, and a biasing member 14, such as a spring and the like, which energizes the pair of arms 15 in a closing direction in which the pair of rollers 13a, 13b approach to each other. A protruding portion 12a which fits into the groove 25a of the flange portion 25 is provided at the concave portion 12.

Each of the rollers 13a 13b is rotatably supported by the respective arms 15 around a center axis line which is substantially parallel to the center axis line of the tool 20 which is supported by the concave portion 12. The pair of rollers 13a, 13b are fitted into the groove 25a of the flange portion 25 so as to support the flange portion 25 at two places in a circumferential direction. The pair of rollers 13a, 13b can be moved in an opening direction in which the pair of rollers 13a 13b are separated from each other so as to against the biasing force applied by the biasing member 14.

The pair of rollers 13a, 13b opens, while they are rotated by the flange 25 which moves in the attaching direction A toward the concave portion 12, and by this, the flange 25 is arranged within the concave portion 12. When the flange 25 is arranged within the concave portion 12, the pair of rollers 13a, 13b gets close to each other by the biasing force of the biasing member 14. In such a state where the pair of rollers 13a, 13b come close to each other, the flange portion 25 is supported by the protruding portion 12a of an inner surface of the concave portion 12 and the pair of rollers 13a 13b, and are stably held within the tool handling portion 9. Also, when the flange 25 which is within the concave portion 12 is moved in a direction opposite from the attaching direction A, the pair of rollers 13a, 13b opens while being rotated, and by this, the flange 25 is removed from the tool holder 9.

The spindle head 6 is a member which has a cylinder portion extending along a perpendicular direction, and which is movably supported by the column 8 in the perpendicular direction. The spindle 5 extends in the perpendicular direction within the spindle head 6, and is supported by the spindle head 6 so as to be rotatable around a longitudinal axis of the spindle 5. The spindle head 6, the spindle 5, and the tool 20 are integrally moved in the perpendicular direction with respect to the table 3 and the workpiece W by a motor (not shown) which is provided in the column 8. Also, the spindle 5 and the tool 20 are integrally rotated around the longitudinal axis of the spindle 5 by a spindle motor 5a which is connected to the upper end portion of the spindle 5. The machine tool 1 machine processes the workpiece W by means of the tool body 21 of the tool 20, which is rotating, while relatively moving the workpiece W and the tool 20 by movement of the table 3 in the horizontal direction and movement of the spindle head 6 in the perpendicular direction.

Figure 8:
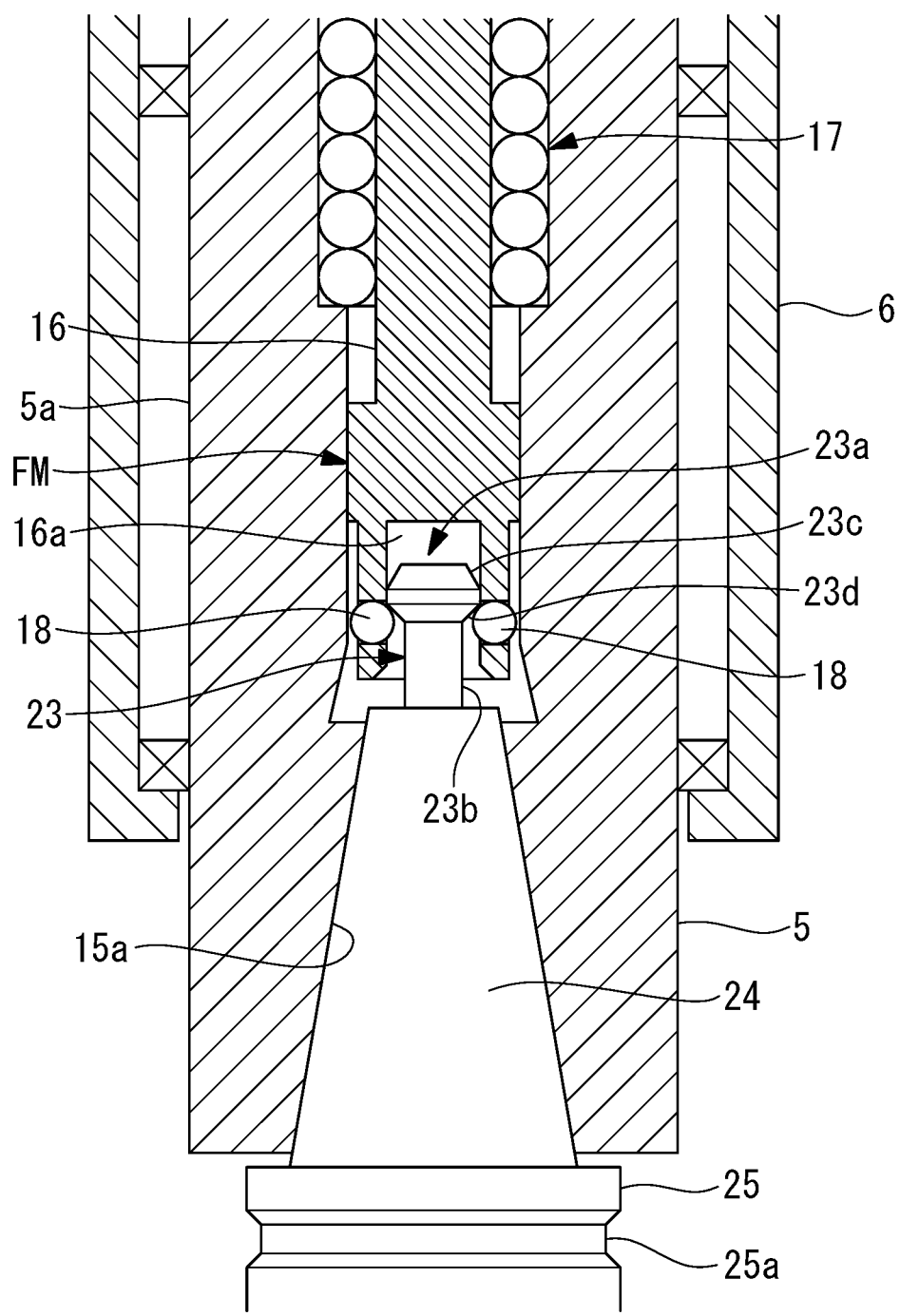
FIG. 8 is a longitudinal sectional view of a spindle.

FIG. 8 shows internal structure of the spindle 5. As shown in FIG. 8, the pull stud 23 and the tapered portion 24 are inserted into the spindle 5 from the lower end side of the spindle 5, and the pull stud 23 is held by a fixing mechanism FM which is within the spindle 5. More specifically, the spindle 5 includes a spindle body 5a having a cylindrical shape, and the fixing mechanism FM which is provided in the spindle body 5a, and which pulls the tools 20 toward the spindle body 5a. An inner surface 15a at the lower end portion of the spindle body 5a, at which the tapered portion 24 is arranged has a tapered shape which is fitted into an outer surface of the tapered portion 24.

The fixing mechanism FM includes a shaft 16 which extends in the perpendicular direction within the spindle body 5a, and an biasing part 17, such as a spring and the like, for pulling the shaft 16 upward in a perpendicular direction. The biasing part 17 may be a hydraulic cylinder, air cylinder, and the like. A center axis line of the shaft 16 and a center axis line of the spindle body 5a correspond with the center axis line of the spindle 5. The pull stud 23 is inserted into the concave portion 16a at the lower end portion of the shaft 16, and the head portion 23a is supported by a plurality of metal balls 18 which are held by the lower end portion of the shaft 16.

More specifically, by moving the shaft 16 downwardly with respect to the shaft body 5a, the plurality of metal balls is in a state movable radially outward. In this state, the head portion 23a of the pull stud 23 is inserted into the concave portion 16a. And, when the shaft 16 is moved upwardly by the biasing portion 17, the metal balls 18 are moved radially inward by an inner circumferential surface of the spindle body 5a. By this, the metal balls 18 come into contact with the tapered surface 23d of the head portion 23a, and the tapered portion 24 of the tool 20 comes into contact with an inner surface 15a which is formed at the lower end of the spindle body 5a. In this state, when the shaft 16 is energized upwardly by the biasing portion 17, the tapered portion 24 is pressed against the inner surface 15a with strong force, and the tool 20 is fixed to the spindle body 5a.

Accordingly, depending on a type of the pull stud 23, magnitude of force for fixing the tool 20 with respect to the spindle 5 are different. For example, the fixing force of the tool 20 will differ in response to an inclination angle θ (FIG. 3) of the tapered surface 23d with respect to the center axis line CL of the tool 20 (corresponding to the center axis line of the spindle 5), a position which is along the center axis line CL of the tapered surface 23d with respect to the tapered portion 23, and the like.

The spindle 5 is suitable for a predetermined type of pull stud 23 which has predetermined shape and size. That is to say, in such a case where the predetermined type of pull stud 23 is used, the spindle 5 fixes the tool 20 with fixing force of rating. For example, as shown in FIG. 3, the predetermined type of pull stud 23 has the inclination angle θ of 45 degrees, and a predetermined size L in a direction which is along the center axis line CL.

As shown in FIG. 7, the machine tool 1 has a visual sensor 30 for capturing images of the pull stud 23 of the tool 20 which is attached to the tool holder 9 at the tool attaching and detaching position P. The visual sensor 30 is a two-dimensional camera, a three-dimensional camera, a three-dimensional distance sensor, and the like. The visual sensor 30 is connected to a controller 40 of the machine tool 1. In this embodiment, the visual sensor 30 is arranged within the space S which is surrounded by the covers 10, 11 of the tool magazine 4, and is attached to the back cover 11.

Figure 9:
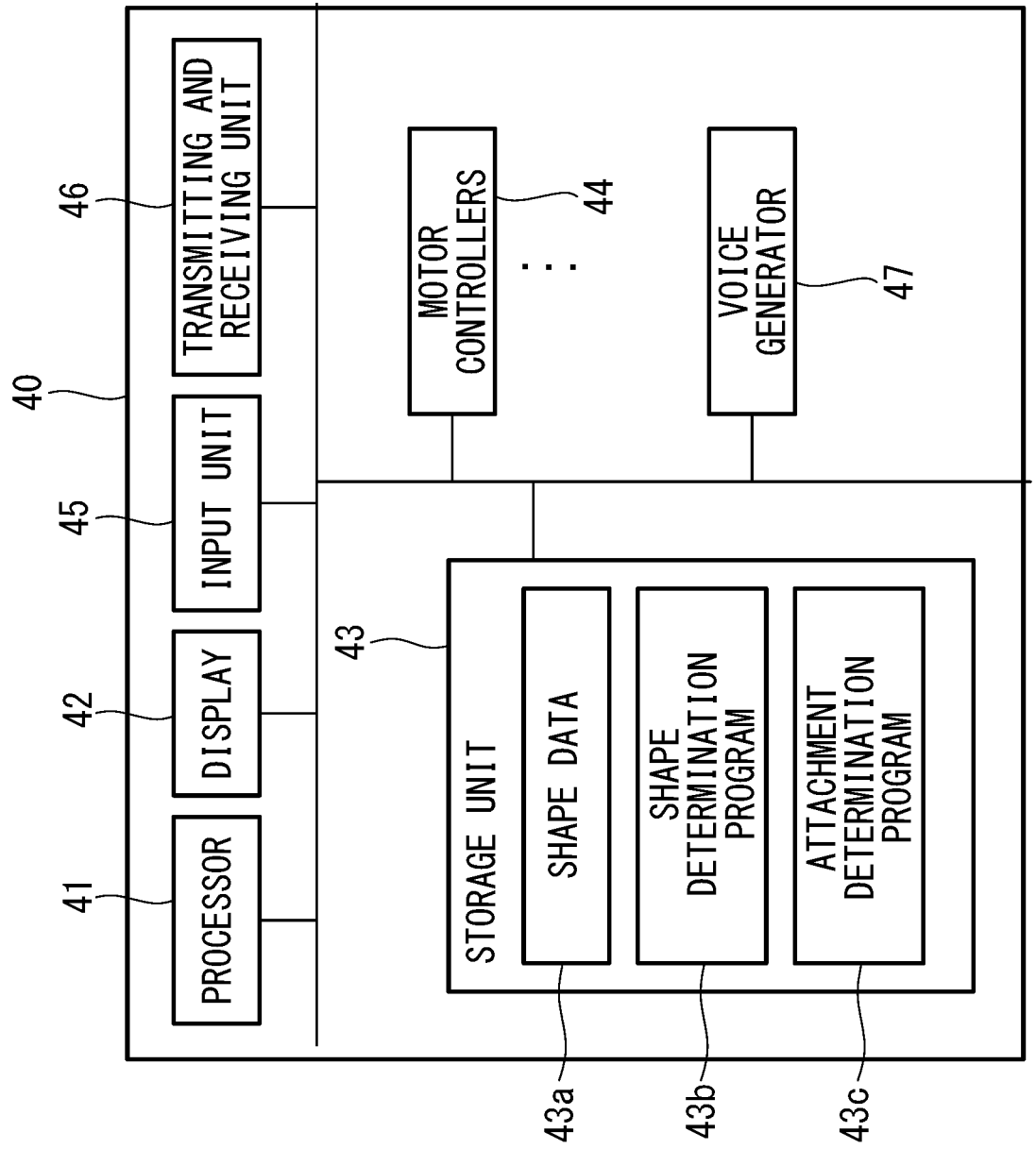
FIG. 9 is a block diagram of a controller of the machine tool of FIG. 1.

As shown in FIG. 9, the controller 40 includes a processor 41 such as a CPU and the like, a display 42, a storage unit 43 having a non-volatile storage, a ROM, and the like, the spindle 5, a plurality of motor controllers 44 for controlling various kinds of motor such as the tool magazine 4, and the like, an input unit 45 which is a key board and the like, a transmitting and receiving unit 46 having an antenna, a connector, and the like, and a voice generator 47 such as a speaker, and the like. The storage unit 43 stores a processing program, and on the basis of the processing program, the processor 41 sends an operation command to the motor controllers 44 so that the machining tool 1 performs machine processing, exchanges the tool 20 with respect to the spindle 5 by using the tool magazine 4, and the like.

Shape data (shape model) 43a of the pull stud 23 which is suitable for this machine tool 1 is stored in the storage unit 43. On the other hand, as shown in FIG. 6, each of the tool holders 9 is provided with an attachment sensor 15a which detects that the tool 20 is attached to or is intended to be attached to the tool holder 9.

The attachment sensor 15a, for example, detects that the tool 20 is attached to or is intended to be attached to the tool holder 9 by detecting a swing position of one of or both of the arms 15. A proximity sensor which is arranged within the concave portion 12, and which detects that the concave portion 12 and the tool 20 get close to or come into contact with each other, a conduction sensor, and the like may be used as the attachment sensor 15a. The attachment sensor 15a is connected to the controller 40, and on the basis of the detected results of the attachment sensor 15a, the controller 40 recognizes that the tool 20 is attached to or intended to be attached to the tool holder 9 at the tool attaching and detaching position P.

For example, the controller 40 sends an imaging command to the visual sensor 30 when the tool 20 is attached to or is intended to be attached to the tool holder 9 at the tool attaching and detaching position P. By this, the detected data (images) of the pull stud 23 of the tool 20 at the tool attaching and detaching position P is obtained. On the basis of a shape determination program 43b which is stored in the storage unit 43, the processor 41 of the controller 40 performs predetermined image processing, such as binarization processing and the like, on the obtained detected data, and compares the pull stud 23 in the processed images with the shape data 43a which is stored in the storage unit 43.

Also, the processor 41 determines whether or not the type of the pull stud 23 of the tool 20 at the tool attaching and detaching position P is suitable for the machine tool 1. And, in such a case where the pull stud 23 of the tool 20 at the tool attaching and detaching position P is not suitable for the machine tool 1, the processor 41 displays predetermined indication (notification) on the display 42 or notifies it by using the voice generator 47. In this case, the display 42 or the voice generator 47 provides a function as a notification device. For example, in such a case where θ of the pull stud 23, which is shown in FIG. 3, and which is suitable for the machine tool 1, is 45 degrees, and when θ of the pull stud 23 of the tool 20 at the tool attaching and detaching position P is 60 degrees, the processor 41 determines that the above described pull stud 23 is not suitable for the machine tool 1.

Also, as shown in FIG. 7, the machine tool 1 may include a position sensor 50 for detecting a position of the proximal end of the pull stud 23 of the tool 20 (length of the pull stud 23) which is attached to the tool holder 9 at the tool attaching and detaching position P. The position sensor 50 is arranged within the space S of the tool magazine 4, and is fixed to the back cover 11, the holding base 9a, and the like. The position sensor 50 has a servo motor 51, a guide 52 extending in a direction which is along an output shaft 51a of the servo motor 51, and a movable member 53 which is movably attached to the guide 52 in an extension direction of the guide 52. The output shaft 51a of the servo motor 51 and the movable member 53 are threadedly engaged with each other, and in response to rotation of the output shaft 51a, the movable member 53 moves along the guide 52. It is preferable that the movable member 53 includes a ball screw nut. The servo motor 51 includes an operation position detecting device, such as an encoder and the like. The servo motor 51 is connected to the controller 40, and the controller 40 recognizes rotation amount and an operation position of the output shaft 51a of the servo motor 51.

When the tool 20 is attached to the tool handling portion 9 at the tool attaching and detaching position P, on the basis of an attachment determination program 43c which is stored in the storage unit 43, the processor 41 of the controller 40 controls the servo motor 51 so that the movable member 53 is brought into contact with the proximal end of the pull stud 23. The processor 41 determines whether or not the position of the proximal end of the pull stud 23, which is calculated from the rotation amount (detected data) and the operation position (detected data) of the output shaft 51a at this time, or from the above described rotation amount and operation position, is within a reference range.

And, in such a case where the position of the proximal end of the pull stud 23 is outside the reference range, the processor 41 displays the predetermined indication (notification) on the display 42 or notifies it by using the voice generator 47. For example, in such a case where the pull stud 23 is not fastened enough, the position of the proximal end of the pull stud 23 will be outside the reference range.

Figure 10:
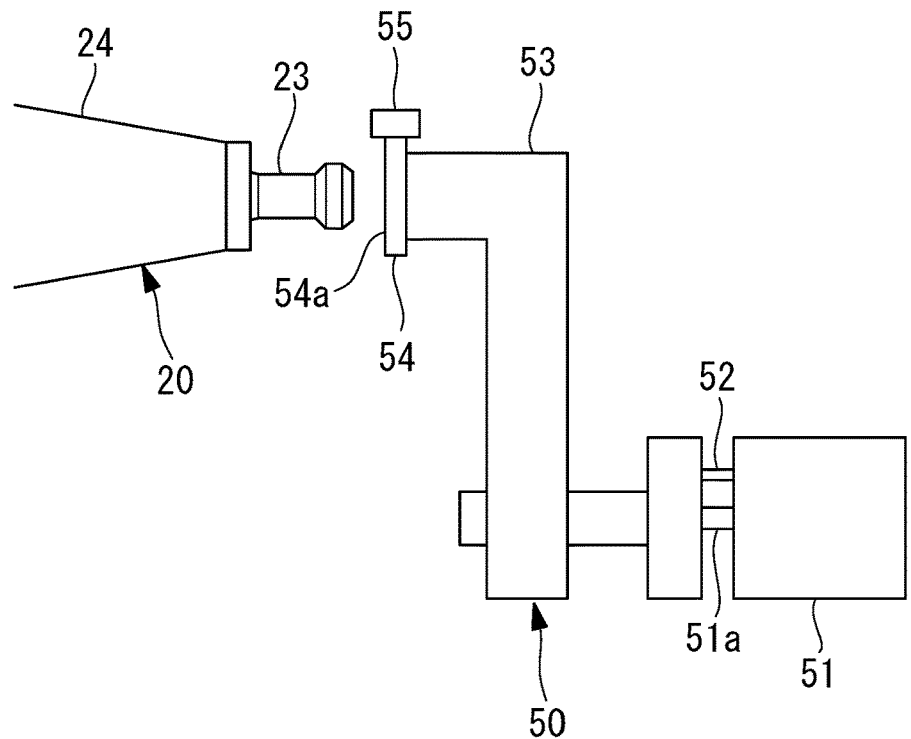
FIG. 10 is a schematic view of a position sensor which measures a position of a distal proximal end portion of a pull stud of the tool.

As shown in FIG. 10, an air blowout member 54 may be provided at a distal end portion of the movable member 53. The air blowout member 54 is connected to an air supplying device (not shown), such as a compressor and the like. A pressure gauge 55 for detecting pressure of air which is blown out from an air blowout surface 54a of the air blowout member 54 is provided, and the pressure gauge 55 is connected to the controller 40. In this case, on the basis of the attachment determination program 43c, the processor 41 of the controller 40 controls the servo motor 51 so as to arrange the movable member 53 at a predetermined position. The processor 41 determines whether or not the detected data of the pressure gauge 55 at this time is within the reference range.

For example, at the above described predetermined position, due to the fact that distance between the proximal end portion of the pull stud 23, which is properly attached, and the movable member 53 comes close to each other, pressure detected by the pressure gauge 55 becomes high. Then, in such a case where the detected data of the pressure gauge 55 is outside the reference range, the processor 41 determines that the length of the pull stud 23 is other than a predetermined length, and the predetermined indication (notification) is displayed on the display 42 or the notification by using the voice generator is performed.

Figure 11:
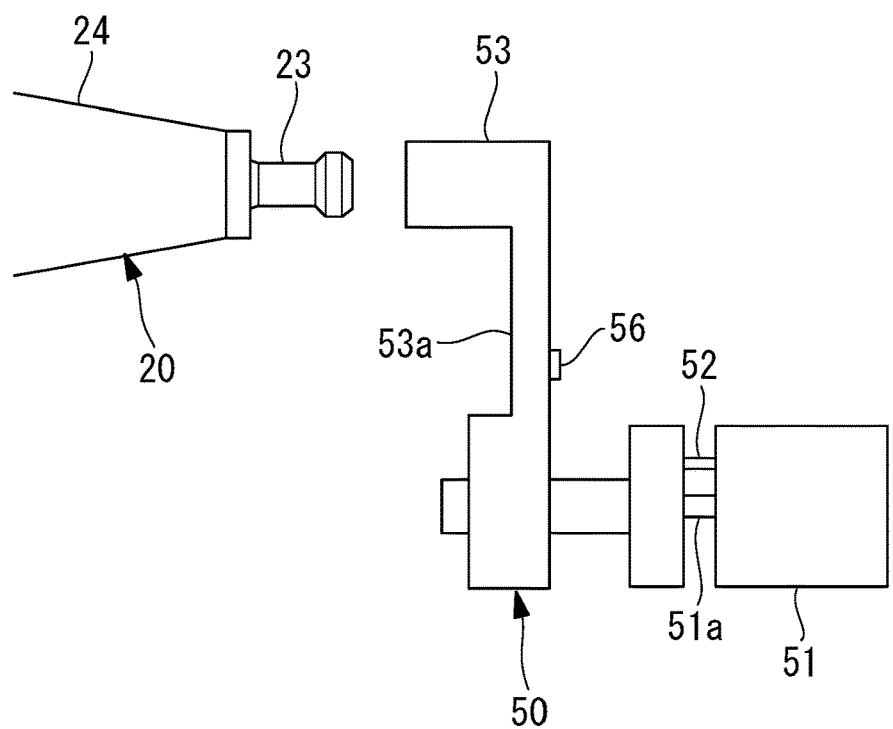
FIG. 11 is a schematic view of another position sensor which measures the position of the distal proximal end portion of a pull stud of the tool.

In addition, as shown in FIG. 11, a strain gauge 56 may be attached to the movable member 53. A deformation portion 53a which can be elastically deformed is provided at least at a part of the movable member 53, and when the movable member 53 comes into contact with the proximal end of the pull stud 23, the deformation portion 53a is elastically deformed. In this case, on the basis of the attachment determination program 43c, the processor 41 of the controller 40 controls the servo motor 51 so as to arrange the movable member 53 at the predetermined position. The processor 41 determines whether or not the detected data of the strain gauge 56 at this time is within the reference range.

For example, at the above described predetermined position, due to the fact that the proximal end portion of the pull stud 23 which is properly attached and the movable member 53 come into contact with each other, the deformation portion 53a is elastically deformed. Also, in such a case where the detected data of the strain gauge 56 is outside the reference range, the processor 41 displays the predetermined indication (notification) on the display 42, or notifies it by using the voice generator 47.

Figure 12:
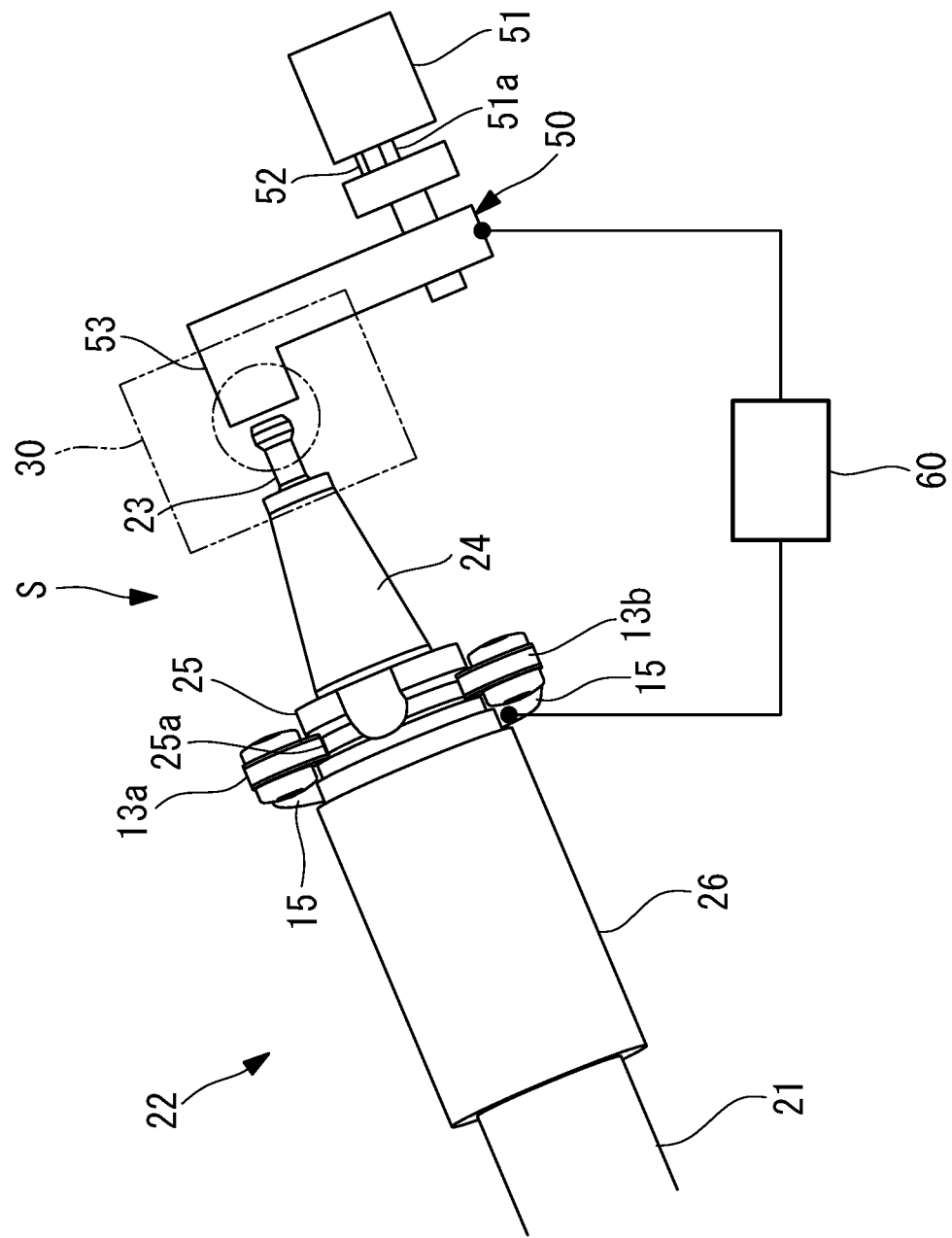
FIG. 12 is a schematic view of a sensor which measures electrical property of the pull stud of the tool.

Moreover, as shown in FIG. 12, an electrical check sensor 60 for detecting electric resistance or electric capacity between the movable member 53 and the tool holder 9 may be provided. The electrical check sensor 60 may be a known ammeter, electric capacitance measurement device, and the like. The electrical check sensor 60 is connected to the movable member 53 and the arms 15 of the tool holder 9. Instead of the arms 15, the electrical check sensor 60 may be connected to the other portion of the tool magazine 4, such as the holding base 9a, the front cover 10, and the like.

In this case, on the basis of the attachment determination program 43c, the processor 41 of the controller 40 controls the servo motor 51 so that the movable member 53 is brought into contact with the pull stud 23. The processor 41 determines whether or not the detected data of the electrical check sensor 60 at this time is within the reference range.

For example, in such a case where the pull stud 23 is not fastened enough, the electric resistance or the electric capacity between the movable member 53 and the arms 15 changes. Also, in such a case where the detected data is outside the reference range, the processor 41 displays the predetermined notification (notification) on the display 42, or notifies it by using the voice generator 47.

Figure 13:
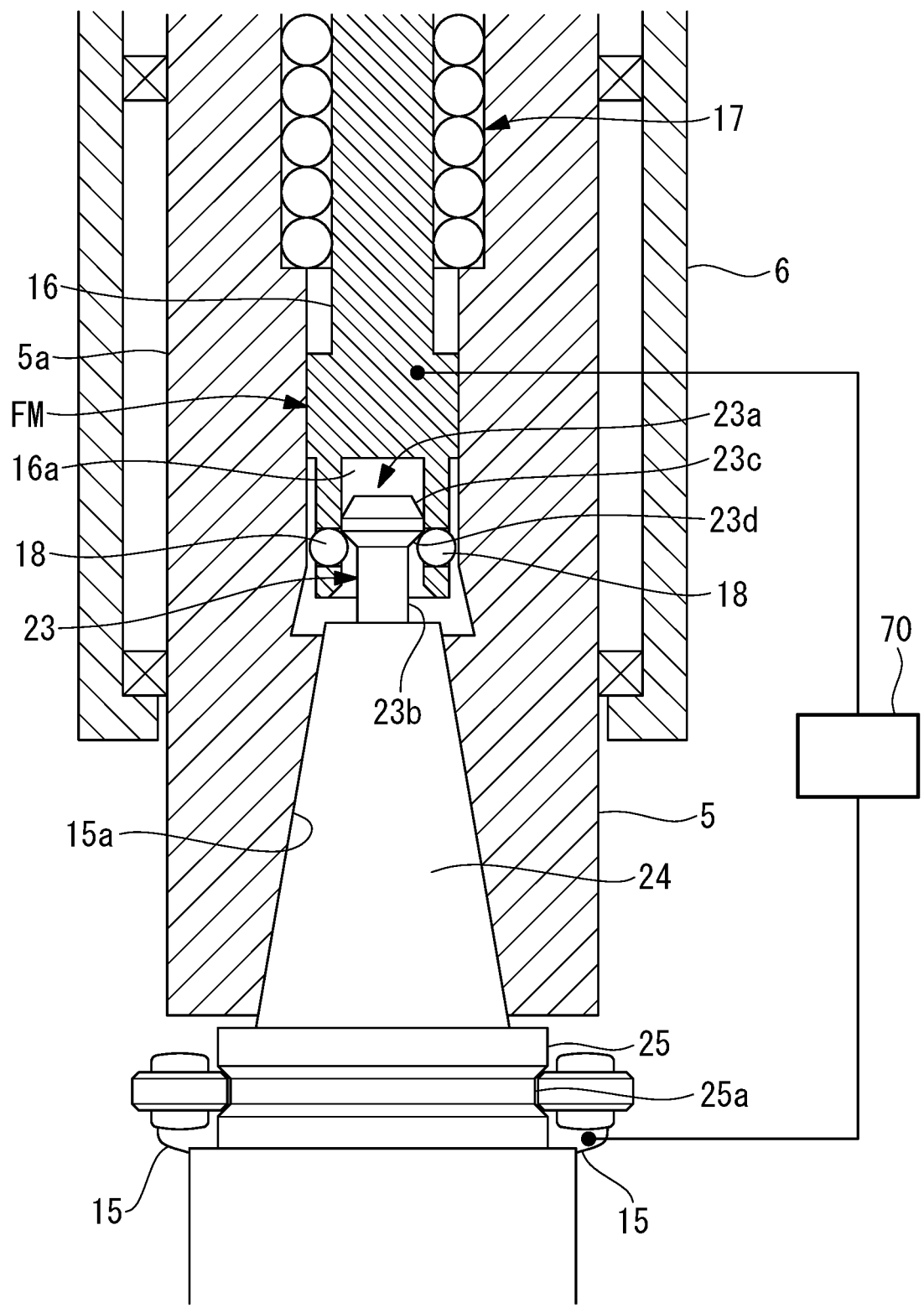
FIG. 13 is a longitudinal sectional view of the spindle showing a sensor which measures electrical property of the pull stud of the tool.

Furthermore, as shown in FIG. 13, an electrical property measurement sensor 70 for detecting electric resistance or electric capacity between the fixing mechanism FM and the tool holder 9 may be provided. The electrical property measurement sensor 70 may be a known ammeter, electric capacitance measurement device, and the like. The electrical property measurement sensor 70 is connected to the shaft 16 of the fixing mechanism FM or the biasing member 17, and the arms 15 of the tool holder 9. Instead of the arms 15, the electrical property measurement sensor 70 may be connected to the other portion of the tool magazine 4, such as the holding base 9a, the front cover 10, and the like.

At the time of attaching the tool 20, which is arranged within the tool changing position, to the spindle 5, on the basis of the attachment determination program 43c, the processor 41 of the controller 40 determines whether or not the detected data of the electrical property measurement sensor 70 is within the reference range.

For example, in such a case where the pull stud 23 is not fastened enough, the electric resistance or the electric capacity between the fixing mechanism FM and the arms 15 changes. Then, in such a case where the detected data is outside the reference range, the processor 41 displays the predetermined indication (notification) on the display 42, or notifies it by using the voice generator 47.

It should be noted that in the above described embodiments, the controller 40 of the machine tool 1 compares the detected data (image) of the visual sensor 30 and the shape data 43a, and determines whether or not the type of pull stud 23 of the tool 20 at the tool attaching and detaching position P is suitable for the machine tool 1. Whereas, there may be another computer having the shape data 43a and the shape determination program 43b, and the other computer may determine whether or not the type of the pull stud 23 of the tool 20 at the tool attaching and detaching position P is suitable for the machine tool 1.

Moreover, in the above described embodiments, the controller 40 of the machine tool 1 determines whether or not the detected data of the position sensor 50, the pressure gauge 55, the strain gauge 56, the electrical check sensor 60, and the electrical property measurement sensor 70 are within the reference range. Whereas, the other computer may determine whether or not the above described detected data is within the reference range.

Figure 14:
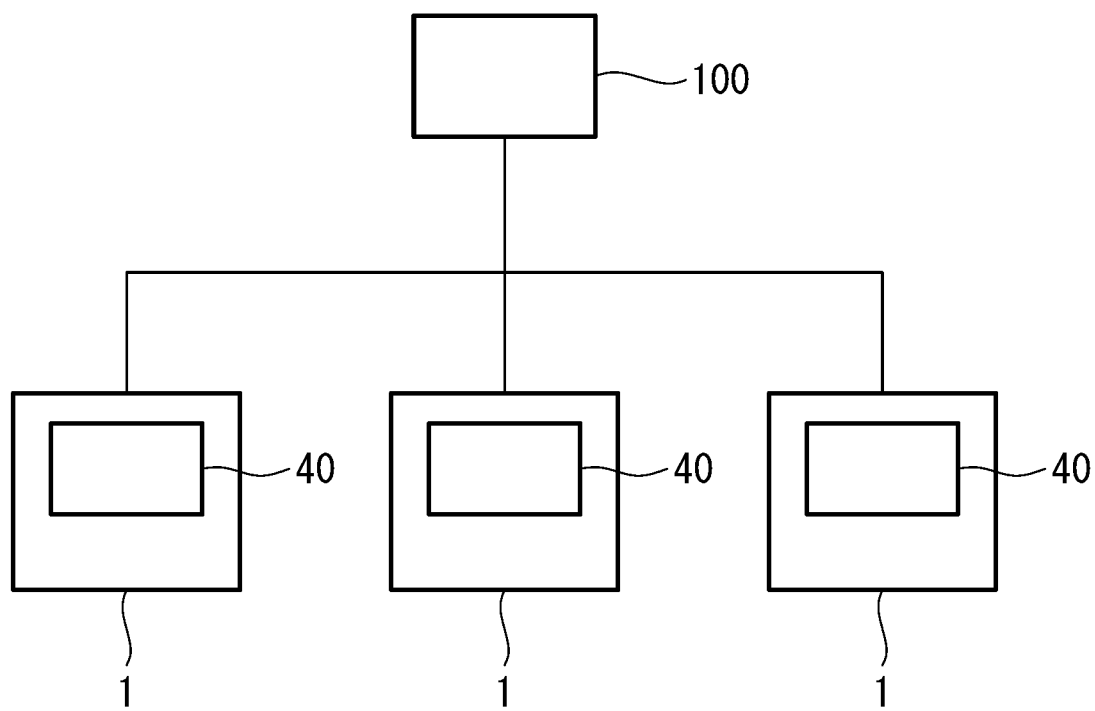
FIG. 14 is a diagram showing connection between a host system and the machine tool.

Further, as shown in FIG. 14, a host system (a computer) 100 for controlling the controller 40 includes the shape data 43a and the shape determination program 43b, and the host system 100 may determine whether or not the type of pull stud 23 of the tool 20 at the tool attaching and detaching position P is suitable for the machine tool 1. And the host system 100 may determine whether or not the data of the position sensor 50, the pressure gauge 55, the strain gauge 56, the electrical check sensor 60, and the electrical property measurement sensor 70 are within the reference range.

Also, in the above described embodiments, the visual sensor 30 is arranged at a position for capturing images of the pull stud 23 of the tool 20, which is attached to the tool holder 9 at the tool attaching and detaching position P, within the tool magazine 4. Whereas, the visual sensor 30 is arranged at another position within the tool magazine 4, and the visual sensor 30 may capture images of the pull stud 30 of the tool 20 of the tool holder 9 which is arranged at a position other than the tool attaching and detaching position P.

Also, the position sensor 50 may be arranged at another position in the tool magazine 4. In this case, the detected data of the position sensor 50, the pressure gauge 55, the strain gauge 56, and the electrical check sensor 60 are related to the tool 20 of the tool holder 9 which is arranged at a position other than the tool attaching and detaching position P.

Also, in the above described embodiments, it is possible to arrange the visual sensor 30 outside the tool magazine 4. And, it is also possible to arrange the visual sensor 30 outside the machine tool 1. In these cases, as long as the visual sensor 30 is arranged at a position where the visual sensor 30 can capture the images of the pull stud 23 of the tool 20 which is attached to the tool holder 9 at the tool attaching and detaching position P, the same or the similar effect as described above can be achieved.

Figure 15:
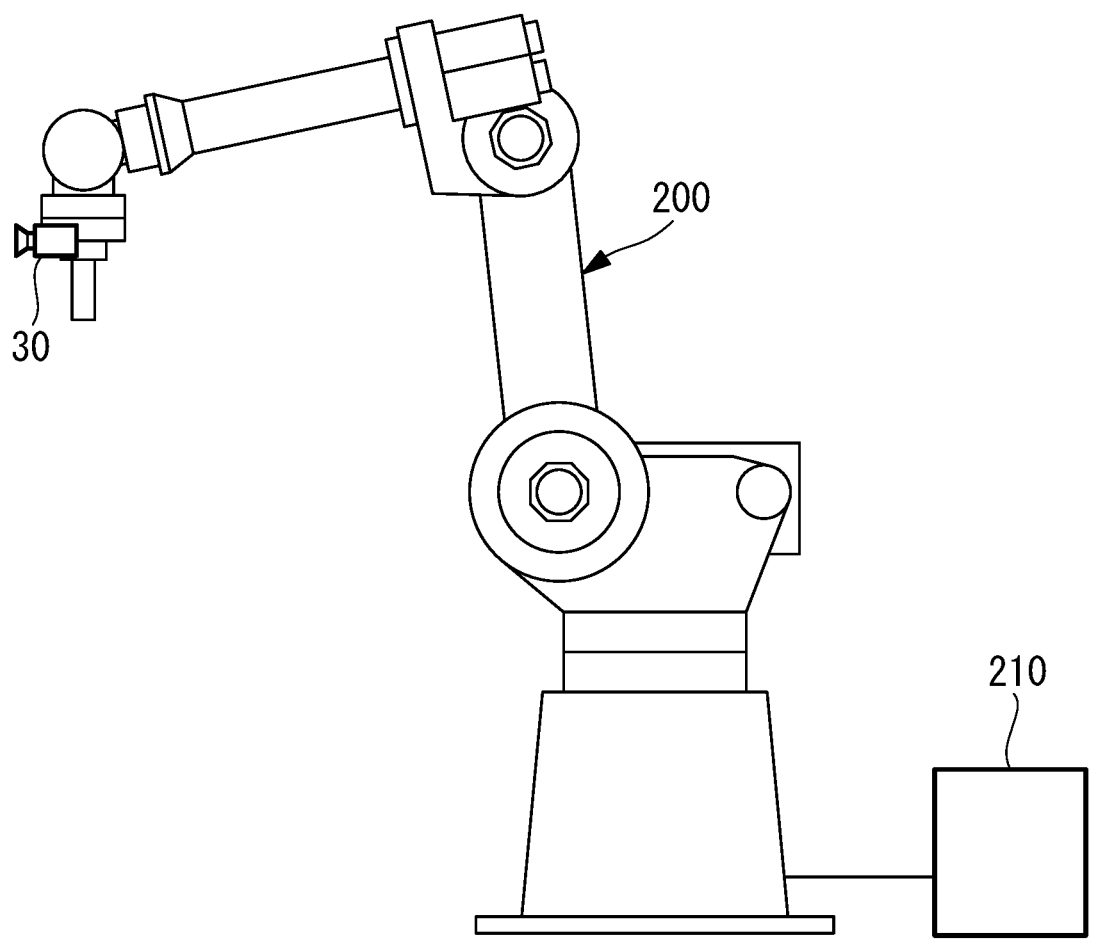
FIG. 15 is a front view of a robot which is used together with the machine tool.

Also, as shown in FIG. 15, the visual sensor 30 may be attached to a distal end portion of a robot 200. In this embodiment, the robot 200 performs a predetermined operation, such as exchanging of the workpieces W, deburring, and the like, with respect to the machine tool 1, for example. The robot 200 is a vertical articulated robot having a plurality of joints, for example. The robot 200 is controlled by a robot controller 210. In this case, when the imaging command is sent to the robot control unit 210 from the controller 40, the robot control unit 210 moves the visual sensor 30 to a predetermined position by means of the robot 200. The above described predetermined position is a position where the visual sensor 30 is capable of capturing images of the pull stud 23 of the tool 20 which is attached to the tool holder 9 at the tool attaching and detaching position P.

In the above described embodiments, on the basis of the detected data of the visual sensor 30 which captures images of the pull stud 23 of the tool 20, the controller 40 determines whether or on the pull stud 23 is appropriate. Therefore, in such a case where an angle of the tapered surface 23d of the pull stud 23 is different, abnormality thereof is effectively and reliably detected. Also, on the basis of the detected results of the sensors, such as the position sensor 50, the pressure gauge 55, the strain gauge 56, the electrical check sensor 60, and the like, which are provided within the tool magazine 4, the controller 40 determines whether or not the pull stud is appropriate. Therefore, in such a case where the pull stud 23 is not fastened enough, abnormality thereof is effectively and certainly detected.

In such a case where there is an abnormality in the pull stud 23 as described above, force for fixing the tool 20 to the spindle 5 changes. For example, in such a case where θ, which is shown in FIG. 3, of 45 degrees is suitable for the machine tool 1, and when θ becomes 60 degrees, force for pulling the pull stud 23 upward by the fixing mechanism FM may be decreased by 5 to 10 percent. The decrease in the fixing force leads to deterioration of processing quality, damage of the tapered portion 24 of the tool 20, damage of the tool body 21 of the tool 20, and the like.

Also, in the above described embodiment, on the basis of the detected data of the electrical check sensor 60 which is provided within the tool magazine 4, it is determined whether or not the pull stud 23 is appropriately fastened. And, in the above described embodiment, on the basis of the detected data of the position sensor 50 which is provided within the tool magazine 4, it is determined whether or not the pull stud 23 is appropriately fastened. These configurations are advantageous for reliably detecting fastening failure of the pull stud 23 by using a simple structure.

Moreover, in the above described embodiment, when it is determined that the pull stud 23 is not suitable, a predetermined notification is performed. With this configuration, an operator can reliably recognize that the pull stud 23 is not suitable In addition, in the above described embodiment, the electrical property measurement sensor 70 for detecting the electric resistance or the electric capacity between the fixing mechanism FM and the tool holder 9 of the tool 20 in the spindle 5 is provided. And, on the basis of the detected data of the electrical property measurement sensor 70, the controller 40 determines whether or not the pull stud 23 is appropriate. With this configuration, the abnormality of the pull stud 23 which is not detected by the tool magazine 4 is detected at the time when the tool 20 is attached to the spindle 5. This configuration enables to reliably detect whether or not the pull stud 23 is appropriate by using the simple structure.

The invention claimed is:

1. A machine tool which processes workpieces by using a tool having a pull stud at a proximal end portion thereof, the machine tool comprising:
   a tool magazine having a plurality of tool holders, each of which the tool is attachable to and detachable from;
   a spindle which holds the tool at the time of processing the workpieces; and
   a controller which determines, based on detected data of a sensor that is provided so as to measure electric resistance of the pull stud when the tool is held by one of the tool holders or so as to measure electric capacity of the pull stud when the tool is held by the one of the tool holders, whether or not the pull stud fits the spindle in a manner so as to be able to be held by the spindle with a reference amount of fixing force.

2. The machine tool according to claim 1, wherein the sensor is an electrical check sensor which detects electric resistance or electric capacity between the pull stud and the tool holder.

3. The machine tool according to claim 1, further comprising a position sensor which detects a position of an end of the pull stud, and
   the controller determines whether or not an attachment state of the pull stud to the tool is appropriate based on whether or not the detected data of the position sensor is within a reference range.

4. The machine tool according to claim 1, wherein the controller makes the determination for fitting at the time of attaching the tool to the tool magazine, and
   when the controller determines that the fitting of the pull stud of the tool is unsuitable to be held by the spindle with the reference amount of force, the controller provides information by using a predetermined warning device.

5. The machine tool according to claim 1, wherein the sensor is an electrical property measurement sensor which detects electric resistance or capacitance between the tool holder and a fixing mechanism for fixing the tool to the spindle.

6. A processing system comprising:
   the machine tool according to claim 1;
   a robot; and,
   a robot controller which controls the robot,
   wherein a visual sensor is attached to the robot, and the robot controller causes the robot to move the visual sensor to a position for capturing images of the pull stud in response to an imaging command from the controller of the machine tool.

7. The machine tool according to claim 1, wherein a visual sensor is provided which captures images of the pull stud of the tool.

* * * * *